United States Patent
Khoshnevisan et al.

(10) Patent No.: US 7,961,369 B2
(45) Date of Patent: Jun. 14, 2011

(54) LARGE-ANGLE AGILE LASER BEAM STEERING APPARATUS AND METHOD

(75) Inventors: Mohsen Khoshnevisan, Newbury Park, CA (US); Ray C. Delcher, Oxnard, CA (US); Mark D. Ewbank, Newbury Park, CA (US); Arthur Chiou, Thousand Oaks, CA (US); William R. Christian, Newbury Park, CA (US); Randolph L. Hall, Newbury Park, CA (US)

(73) Assignee: Teledyne Licensing, LLC, Thousand Oaks, CA (US)

( * ) Notice: Subject to any disclaimer, the term of this patent is extended or adjusted under 35 U.S.C. 154(b) by 430 days.

(21) Appl. No.: 11/238,590

(22) Filed: Sep. 28, 2005

(65) Prior Publication Data

US 2007/0070482 A1     Mar. 29, 2007

(51) Int. Cl.
*G02B 26/12* (2006.01)
(52) U.S. Cl. ............... 359/223.1; 359/196.1; 359/197.1; 359/209.1; 359/224.1
(58) Field of Classification Search ............ 372/92–103; 359/196.1, 223.1
See application file for complete search history.

(56) References Cited

U.S. PATENT DOCUMENTS

| | | | | |
|---|---|---|---|---|
| 3,672,746 A * | 6/1972 | Miller | ............................ | 359/579 |
| 3,974,507 A * | 8/1976 | Chemelli et al. | .............. | 347/258 |
| 4,547,801 A * | 10/1985 | Haisma et al. | ............... | 378/98.3 |
| 4,910,454 A * | 3/1990 | Williamson | ............... | 324/76.36 |
| 6,526,079 B1 * | 2/2003 | Watterson et al. | ............. | 372/32 |
| 6,631,033 B1 * | 10/2003 | Lewis | ............................ | 359/584 |
| 6,747,775 B2 * | 6/2004 | Little | ............................ | 359/238 |
| 6,751,009 B2 | 6/2004 | Khoshnevisan et al. | | |
| 7,052,142 B2 * | 5/2006 | Gupta | ............................ | 353/46 |
| 2002/0054614 A1 * | 5/2002 | Jin | ................................ | 372/20 |
| 2002/0154315 A1 * | 10/2002 | Myrick | ........................ | 356/451 |

* cited by examiner

*Primary Examiner* — Minsun Harvey
*Assistant Examiner* — Xnning Niu
(74) *Attorney, Agent, or Firm* — Koppel, Patrick, Heybl & Philpott (57) ABSTRACT

A laser beam steering apparatus includes a beam steering cell with an adjustable shape, with the cell having opposing Fabry-Perot filters, and a steering mechanism coupled to the cell to adjust its shape so that the direction of a laser beam emitted from the cell is changed in response to a change in the cell shape.

18 Claims, 4 Drawing Sheets

LARGE-ANGLE AGILE LASER BEAM STEERING APPARATUS AND METHOD

GOVERNMENT RIGHTS

This invention was made with Government support under Contract No. N66001-00-C-8068 awarded by the Defense Advanced Research Projects Agency (DARPA). The Government has certain rights in this invention.

BACKGROUND OF THE INVENTION

1. Field of the Invention

This invention relates to laser beam steering and more particularly laser beam steering using Fabry-Perot cells.

2. Description of the Related Art

High-resolution large-angle laser beam steering is increasingly required for a variety of applications, including free-space laser communication, laser radar, target illumination, laser countermeasures, and remote optical sensing. Alternately called dielectric mirrors, filters or thin-film filters, these components are often used to steer laser beams by reflection because of the minimal energy absorption and higher energy tolerance associated with such mirrors, in comparison with metallic mirrors. They have high reflection coefficients over wide bandwidths and are a 1-D subset of a more general class of 3-, 2-, or 1-dimensional periodically structured dielectrics, otherwise known as photonic bandgap (PBG) materials. Light having wavelengths in the band gap is strongly reflected. Formed from a multi-layer stack of dielectric substances with alternating high/low indexes of refraction, the stack may reflect 99% of the laser photons, with the remaining 1% mostly transmitted, rather than absorbed. For such stacks, the width of the reflection band is a significant fraction (for example, >5%) of the center wavelength of the reflection band. The ability to steer laser beams over large elevation and azimuth angles, with minimum mechanical movements, without cascading multiple steering stages and with fast response times presents technical challenges, however. Other technical challenges include designing for cost efficient manufacturing and design scalability to allow a wide beam diameter.

Typical beam steering solutions include angular rotation of reflectors, gratings or holograms, sometimes arranged as rotating polygons, for beam steering in one dimension, or a cascade of multiple elements to scan in two dimensions (x-y, or azimuth and elevation). Beam steering units on mobile platforms often are mechanical gimbals with rotating prisms or lens movements, cascaded for two-dimensional steering, and separate elements for fine and coarse angle steering. Those solutions tend to suffer from being large, heavy, and having slow response times. Many non-gimbaled approaches have been developed, such as a combination of lenses, rotating prisms or lens arrays, acousto-optic, electro-optic, micromechanical cantilevers, and more, each with their own limitations, particularly in terms of achieving large angle, two-dimensional laser beam steering. A particular characteristic has been the requirement for using two-stage cascades of one-dimensional beam steering elements to span large angle X-y, or azimuth and elevation angles. One non-gimbaled single-stage 2-dimensional beam steering solution is taught by M. Khoshnevisan in U.S. Pat. No. 6,751,009 ("the '009 patent"). The '009 patent teaches the combination of an acousto-optic fine scan and micro-optic deflectors to provide agile gimballess coarse beam steering over large angles. The micro-optic deflector includes at least two micro-lens arrays disposed adjacent one another with the micro-lens arrays being micro-translatable in X and/or Y directions relative to one another. Unfortunately, several features are not ideal, including the requirement for very high quality microlens arrays for large-angle steering, and limited scalability of the design for larger beam diameters.

A need still exists, therefore, for laser beam steering in a compact and affordable package that is scalable for larger beam widths while maintaining fast response times.

SUMMARY OF THE INVENTION

A steering apparatus and method is disclosed for steering a laser beam. A beam steering cell with an adjustable shape and opposing Fabry-Perot filters, a steering mechanism coupled to the cell to adjust its shape so that the direction of a laser beam emitted from said cell is changed in response to a change in the cell shape.

In one embodiment, the beam steering apparatus includes first and second Fabry-Perot plates spaced adjacent to and at an angle from each other to establish a beam steering cell. It also includes an actuator coupled to the second Fabry-Perot plate to vary the angle so that the second plate transmits, blocks and transmits a laser beam entering the cell when the second plate is positioned at first, second and third angles, respectively, so that said laser steering apparatus is operable to steer the beam.

One embodiment of the invention involves a method for laser beam steering that includes propagating a laser beam in a beam steering cell having first and second Fabry-Perot plates disposed at an angle to each other, transmitting the input laser beam through the first plate in a first direction at a Fabry-Perot transmission peak, changing the angle between the plates so that the laser beam is transmitted through the first plate in a different direction at a different Fabry-Perot transmission peak as a result of changing the angle between the plates. As a result, the beam steering cell provides different transmission peaks for said laser beam at different angles to steer said laser beam.

BRIEF DESCRIPTION OF THE DRAWINGS

The components in the figures are not necessarily to scale, emphasis instead being placed upon illustrating the principles of the invention. Like reference numerals designate corresponding parts throughout the different views.

DETAILED DESCRIPTION OF THE INVENTION

A single-stage beam steering system is described for steering a beam through large deflection angles in both one and two dimensions without proportionate and cumbersome angular control of mirrors or gimbals. The system uses Fabry-Perot effects to reflect, propagate and transmit a beam between and through a beam steering cell that has an adjustable shape. Small changes in the cell shape, in one embodiment adjustment of the plate angle between two Fabry-Perot plates comprising the cell, results in large angular changes of the angle of the steered beam through the beam steering system. Finer angular control can be achieved through the use of tunable lasers to change the beam wavelength prior to introduction to the cell or by piezo-electric translation of the distance between Fabry-Perot plates forming the cell.

Figure 1:
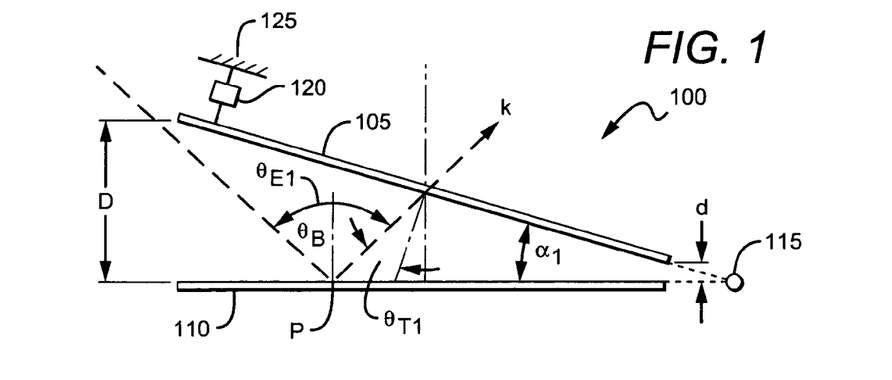
FIGS. 1-3 are cross section and ray diagrams of one embodiment of a beam steering cell having two Fabry-Perot plates that are disposed at successively different plate angles (α) to steer a laser beam ("beam") introduced between them.

FIG. 1 illustrates beam propagation in one embodiment of a beam steering apparatus 100 in which an incident beam is injected into the cell from the open end of the wedge made by the plates. In the embodiment of the apparatus provided in FIG. 1, top and bottom plates, preferably two optically resonant dielectric structures such as Fabry-Perot plates (105, 110), are positioned at a plate angle $\alpha_1$, from one another to accept a beam k into an interior space between them forming a beam steering cell. Each plate 105., 110 is composed of a stack of dielectric layers (a PBG stack with wide reflection band of wavelengths) on either side of a substrate that control the reflection, propagation and transmittance of the beam k through the beam steering apparatus 100. Incident angle $\theta_B$ of the beam on the bottom plate, beam wavelength $\lambda_B$, plate angle $\alpha_1$ and beam mid-point P are each chosen to accomplish a predetermined system exit angle $\theta_{E1}$ of the beam k. $\theta_{E1}$ is measured as the angle between the beam's incoming and outgoing directions. Each plate does not provide 100% reflectance. For simplicity, FIG. 1 does not show the rays that pass through the top and bottom plates upon partial transmittance. As illustrated, the beam is substantially reflected off of the bottom plate 110 at beam mid-point P and strikes the upper plate at a top plate transmission angle $\theta_{T1}$. $\theta_{T1}$ represents one of a plurality of upper plate incident angles at which the beam experiences Fabry-Perot constructive interference within top plate 105 to produce an amplitude transmission peak through the dielectric stacks of the top plate 105. If the bottom plate 110 is a Fabry-Perot filter, the beam can also exit through the bottom plate, adding to the angular range of the exit beams. Alternatively, in the configuration shown in FIG. 1, the bottom plate 110 can be a 100% reflector, allowing output beam k to exit only through the top Fabry-Perot plate.

The end-plate separation distance D where the beam enters the steering apparatus 100 is preferably twice the beam width to allow beam clearance for varying plate angles. Plate angle $\alpha_1$ is varied, for example, by rotating the top plate 105 about a hinge point 115 with an actuator, preferably a microactuator 120 which itself is coupled between the top plate 105 and a support 125. The hinge point 115 is either an actual hinge or a point in space around which the micro actuator 120 rotates the top plate 105. Two micro-actuators would be used to steer the beam in two dimensions, by changing the wedge angle in the plane shown in FIG. 1, and simultaneously, a second wedge angle into or out of the plane of FIG. 1. In a beam steering apparatus 100 having a plate angle $\alpha_1$ of between 0-4° and designed for a beam wavelength of 1550 nm, the apparatus would have the dimensions listed in Table 1.

TABLE 1

| | Millimeters (mm) |
|---|---|
| Top plate 105 width | 25 |
| Bottom plate 110 width | 25 |
| Beam k width | 1.5-2 |
| End-plate separation distance D | 3-4 |
| Plate separation distance d | 1 |

Although top and bottom plates 105, 110 are illustrated in only two dimensions, for the edge-illuminated cell design, the plates are preferably square but, for 1-dimensional beam steering, can be rectangular and have a width as small as a few times the beam width. If a wider beam width is desired, the plate dimensions and end-plate separation distance D would be sized appropriately.

Figure 2:
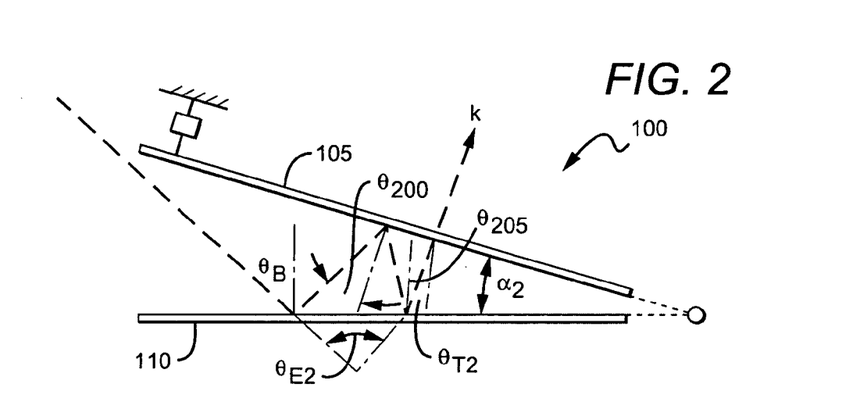
Figure 3:
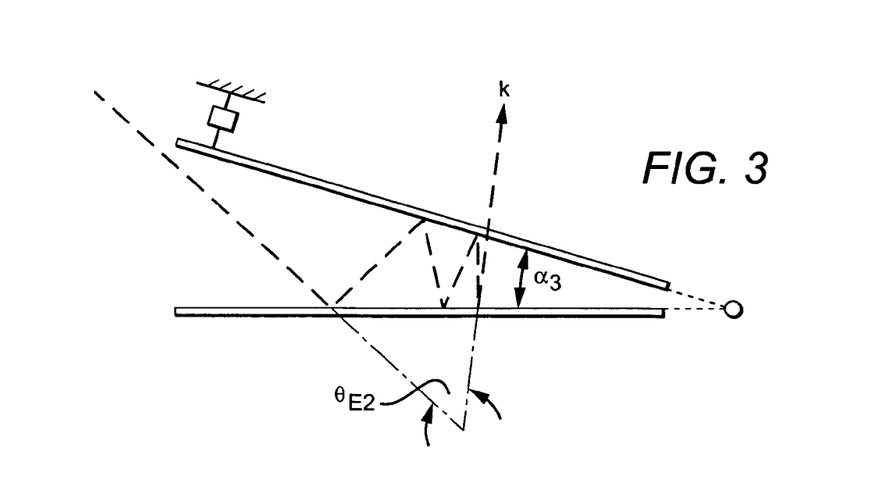

FIGS. 2 and 3 illustrate the effects of slightly increasing the plate angle $\alpha_1$ to predetermined angles $\alpha_2$ and $\alpha_3$ (FIGS. 2 and 3, respectively) to step through two additional and predetermined system transmission peaks at exit angles $\theta_{E2}$ and $\theta_{E3}$, respectively. In FIG. 2, the beam k is again introduced to the beam steering apparatus 100 at beam mid-point P and at an incident angle $\theta_B$ for reflection to the top plate 105. In FIG. 2, however, actuator 120 has affected a slightly increased plate angle $\alpha_2$ about hinge 115 of, by way of example and not limitation, 0.2 degrees. As a result, the beam k is reflected to the top plate 105 to arrive at an incident angle $\theta_{200}$ that does not correspond to a top plate transmission peak. Incident angle $\theta_{200}$ results in reflectance by the top plate 105 back down to the bottom plate 110 to arrive at an incident angle $\theta_{205}$ which is not a transmission angle for the bottom plate. The beam is again reflected back to the top plate 105. Because this second reflection by the bottom plate 110 results in a top plate transmission angle $\theta_{T2}$ corresponding to a top plate transmission peak, the beam k is finally transmitted through the top plate 105 at system exit angle $\theta_{E2}$. Small changes in the plate angle $\alpha_n$ (alternatively called a "wedge angle") result in large changes in the angle of the steered exit beam through predetermined transmission angles $\theta_{TN}$. Fine steering between the discrete coarse angle spots is achieved by fine tuning of the laser wavelength or tuning of the Fabry-Perot filter response (described in more detail, below). Also, FIGS. 1-3 illustrate relatively few beam reflections between the top and bottom plates prior to transmittance for illustrative simplicity. In practice, many more reflections would likely occur prior to transmittance through the beam steering apparatus. For example, each reflection of the trapped beam between the plates 105, 110 results an angular change of twice the plate angle $\alpha$ for the beam. At small plate angles $\alpha_n$, many reflections will occur prior to accomplishing any significant change in its incident angle $\theta$ to approach the particular transmission peak for the beam's wavelength and steering cell geometry. The embodiment of the invention described herein demonstrates large angle steering with no increase in beam divergence. Therefore, the devices can produce very high resolution. For example, for a device with +/−60° coarse and fine steering capability, and 3 mm beam diameter at 1,550 nm wavelengths, the expected beam divergence will be 0.5 mrad or 0.03 degrees, leading to large resolvable number of spots N (defined as N=Angular Deflection Range/Beam Divergence angle.) N=120/0.03=4,000 spots along one axis, and N=16 Million spots for two-axis beam steering operation in a single stage.

The discrete system exit angles for a particular beam wavelength are predetermined by the system design and may be represented by a lookup table of exit angles versus the preferred settings of wedge angle $\alpha$, such as that found in Table 2. The comb shape of Fabry-Perot cell transmission with wavelength or incidence angle sometimes leads to multiple options for wedge angle setting, for a given desired exit angle. In such cases, the optimal choice of wedge angle setting would be made for the setting that produces the desired exit angle with least number of reflections within the cell, to minimize losses. Wedge angle settings would be done rapidly in real time by a controller (not shown) using lookup table values for the settings.

TABLE 2

| Examples of System exit angle, $\theta_{En}$ (Degrees) | Examples of Preferred Plate angle, $\alpha_n$ (Degrees) |
|---|---|
| 2.0 | 1.245 |
| 3.5 | 1.762 |
| 5.5 | 2.159 |
| 8.6 | 1.835 |
| 12.2 | 2.710 |
| 14.7 | 1.369 |
| 16.4 | 1.921 |
| 19.7 | 1.951 |
| 21.4 | 2.044 |
| 23.0 | 2.678 |
| 26.7 | 3.136 |
| 30.3 | 2.926 |
| 32.7 | 2.628 |
| 35.0 | 3.343 |
| 37.6 | 3.592 |
| 42.4 | 3.411 |
| 44.4 | 3.56 |

Illustrated in FIG. 3, the actuator 115 again affects a slightly increased plate angle to $\alpha_3$ resulting in additional reflections between the top and bottom plates 105, 110 to steer the beam k through a third exit angle $\theta_{E3}$. As illustrated in FIGS. 1-3, large changes in the coarse angle of the steered exit beam relative to the input laser beam are made possible in response to minimal changes in the wedge angle of the cell.

Figure 4:
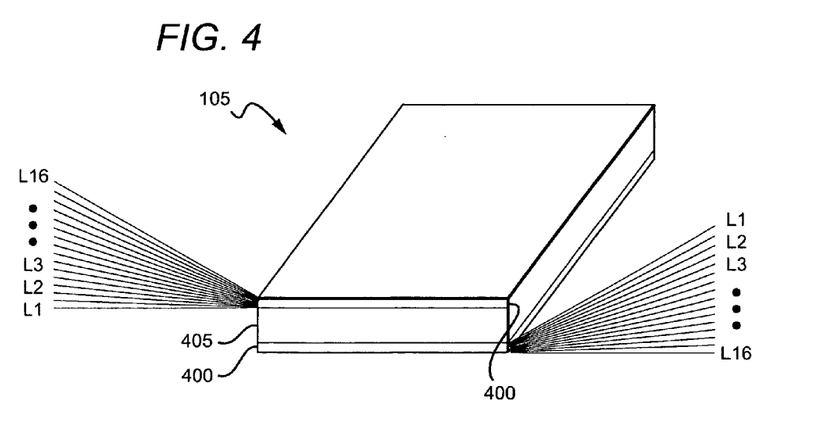
FIG. 4 is a cross section of one embodiment of each Fabry-Perot plate used in FIGS. 1-3, consisting of a flat dielectric substrate having parallel sides and coated on both sides with PBG reflector layers forming a dielectric stack.

FIG. 4 illustrates one embodiment of Fabry-Perot top plate 105 that has two multi-layer wide-bandwidth dielectric PBG stacks 400 separated and supported by a substrate 405 having parallel and highly polished top and bottom surfaces, preferably formed from fused quartz ($SiO_2$), for steering a short wavelength infrared or visible laser beam. The substrate 405 can also be borosilicate glass, sapphire, Si, Ge, ZnS, or ZnSe or other material that is acceptably transparent to the utilized beam wavelength used by the top plate 105. It is also possible to have the substrate shown in FIG. 4 between the two multi-layers be air, with each dielectric stack having been deposited on a separate substrate. Each dielectric stack 400 consists of a ¼-wave stack of dielectric materials, such as those listed in Table 3, to form a highly reflective surface at 1550 nm for use in the visible to short wavelength infrared spectrum. The dielectric stacks 400 preferably exhibit sharp comb-like spectral transmission and reflection spectra when separated by a highly polished flat and parallel substrate to form a Fabry-Perot filter, so that light can be injected into, and extracted form the cell at the desired angles.

TABLE 3

| Layer | Dielectric Material | Thickness (nm) |
|---|---|---|
| 1 | Si | 25.44 |
| 2 | SiO—P | 598.79 |
| 3 | Si | 113.97 |

TABLE 3-continued

| Layer | Dielectric Material | Thickness (nm) |
|---|---|---|
| 4 | SiO—P | 152.21 |
| 5 | Si | 83.36 |
| 6 | SiO—P | 110.60 |
| 7 | Si | 82.21 |
| 8 | SiO—P | 148.64 |
| 9 | Si | 106.45 |
| 10 | SiO—P | 202.77 |
| 11 | Si | 116.15 |
| 12 | SiO—P | 213.37 |
| 13 | Si | 116.95 |
| 14 | SiO—P | 214.54 |
| 15 | Si | 115.75 |
| 16 | SiO—P | 266.46 |

Each dielectric stack 400 is highly reflective over a broad range of bean incident angles and is substantially polarization insensitive to allow the use of arbitrary polarized beams in the beam steering system. A less reflective dielectric stack 400 would result in larger full-width half-maximum values at each transmission angle $\theta_{Tn}$ peak, while a dielectric stack 400 having greater reflectance would result in reduced full-width half-maximum values at each transmission angle $\theta_{Tn}$ peak. Layer L1 in the table is coupled to the substrate 405, with layer L2 coupled to layer L1

Figure 5:
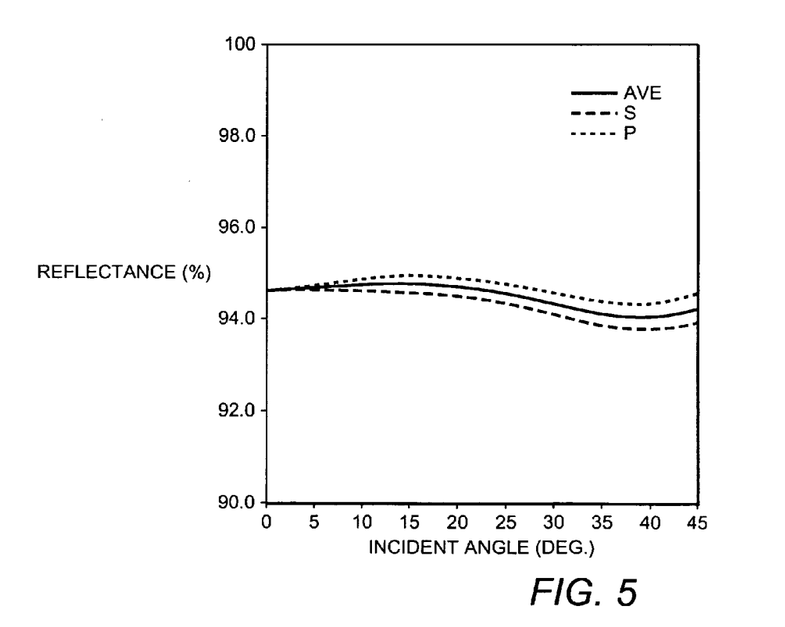
FIG. 5 is a graph illustrating reflectance versus beam incident angle for each individual PBG stack illustrated in FIG. 4, for two incident polarizations (s, and p, and average of s and p).

FIG. 5 illustrates beam reflectance versus incidence angle for the dielectric stack 400 described in Table 3 for two incident polarizations (s, p and the average of s and p) for a beam having a wavelength of 1550 nm. Average, parallel (to the top plate surface) and perpendicular (to the top plate surface) polarization curves are labeled as AVE, S and P curves, respectively. The AVE, S and P curves indicate high reflectivity over incidence angles between 0-45° with approximately constant reflectance values to allow beam reflection between opposing dielectric stacks 400 and to establish Fabry-Perot effects when formed in the top plate 105 of FIG. 4. Because reflectance is high but not 100% over a range of incidence angles, Fabry-Perot destructive and constructive beam interference effects result in transmission peak through the top plate at predetermined beam wavelengths and incidence angles. In the system illustrated in FIGS. 1-3, each Fabry-Perot plate would have two such dielectric stacks 400 separated by the substrate 405.

Figure 6:
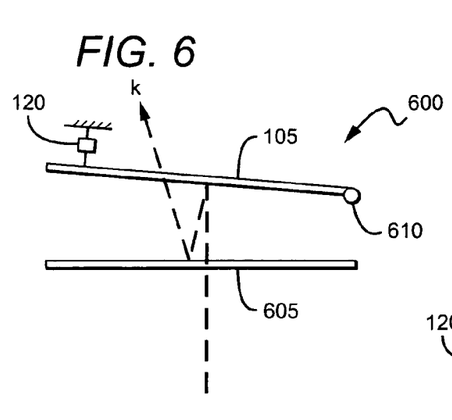
FIGS. 6 and 7 are cross section and ray diagrams of a face-illuminated beam steering cell in which the beam is introduced into an interior of the cell at a Fabry-Perot transmission peak of the lower Fabry-Perot plate to provide beam steering through the upper Fabry-Perot plate.
Figure 7:
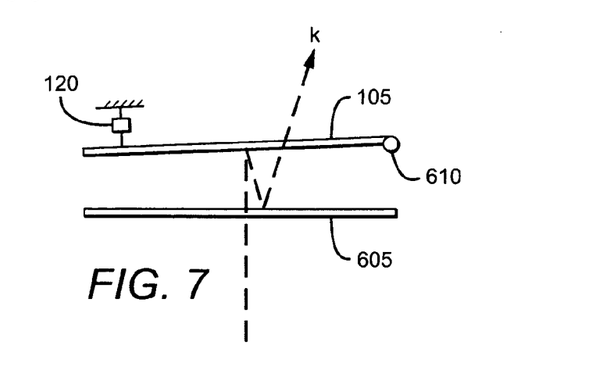

FIGS. 6 and 7 illustrate an alternative embodiment beam steering system 600 in which the incident beam is introduced into the cell through the input face of the cell at a transmission peak of the bottom plate, which is preferably a Fabry-Perot plate 605. The bottom plate 605 preferably has characteristics of a funnel or notch filter at beam incident angles between approximately 0-10 degrees from vertical. The beam k illuminates an exterior face of the bottom plate and is partially transmitted into the interior formed by the top and bottom plates 105, 600 to form a beam steering cell. The top and bottom plates 105, 600 form a wedge angle between them that is varied to steer the beam k. Upon reflection and return of the beam k from the top plate 105, its incidence angle has changed by twice the plate angle α (not shown). The beam is shown exiting through the top plate 105 when the incidence angle has incrementally changed to match a transmission peak of the top plate 105. A hinge 610 allows the actuator 120 to steer the beam k in either direction from center. The plate angle is micro-adjusted to induce the final deflected beam to exit at the desired angles. In an alternative embodiment, a second hinge and actuator are provided and hinge 610 is adapted to allow rotation of the top plate in a second axis so that the beam k may be directed in three dimensions (not shown). Such embodiment provides up to full 360° azimuth angle, and the wedge angle setting determines the elevation angle. In this embodiment, the top and bottom plates 105, 605 preferably have a circular cross section. For the embodiment illustrated in FIGS. 6 and 7 designed for a center wavelength of 1,550 nm, each dielectric stack on bottom plate 600 would have the dielectric layers and thicknesses listed in Table 4.

TABLE 4

| Layer | Dielectric Material | Thickness (nm) |
| --- | --- | --- |
| 1 | NB$_2$O$_5$ | 173.37 |
| 2 | SiO$_2$ | 265.79 |
| 3 | NB$_2$O$_5$ | 185.49 |
| 4 | SiO$_2$ | 269.10 |
| 5 | NB$_2$O$_5$ | 184.55 |
| 6 | SiO$_2$ | 295.25 |
| 7 | NB$_2$O$_5$ | 234.76 |
| 8 | SiO$_2$ | 335.66 |
| 9 | NB$_2$O$_5$ | 261.53 |
| 10 | SiO$_2$ | 260.45 |
| 11 | NB$_2$O$_5$ | 179.48 |
| 12 | SiO$_2$ | 270.87 |
| 13 | NB$_2$O$_5$ | 180.82 |
| 14 | SiO$_2$ | 271.67 |
| 15 | NB$_2$O$_5$ | 179.73 |
| 16 | SiO$_2$ | 271.75 |
| 17 | NB$_2$O$_5$ | 179.37 |
| 18 | SiO$_2$ | 273.73 |
| 19 | NB$_2$O$_5$ | 180.43 |
| 20 | SiO$_2$ | 269.03 |
| 21 | NB$_2$O$_5$ | 186.53 |
| 22 | SiO$_2$ | 251.87 |
| 23 | NB$_2$O$_5$ | 225.02 |
| 24 | SiO$_2$ | 365.51 |
| 25 | NB$_2$O$_5$ | 614.83 |
| 26 | SiO$_2$ | 258.94 |
| 27 | NB$_2$O$_5$ | 179.53 |
| 28 | SiO$_2$ | 265.80 |
| 29 | NB$_2$O$_5$ | 177.42 |
| 30 | SiO$_2$ | 267.03 |
| 31 | NB$_2$O$_5$ | 177.37 |
| 32 | SiO$_2$ | 265.62 |
| 33 | NB$_2$O$_5$ | 177.53 |
| 34 | SiO$_2$ | 263.46 |
| 35 | NB$_2$O$_5$ | 178.92 |
| 36 | SiO$_2$ | 257.04 |
| 37 | NB$_2$O$_5$ | 181.13 |
| 38 | SiO$_2$ | 245.32 |
| 39 | NB$_2$O$_5$ | 1243.67 |
| 40 | SiO$_2$ | 232.76 |
| 41 | NB$_2$O$_5$ | 190.50 |

Figure 8:
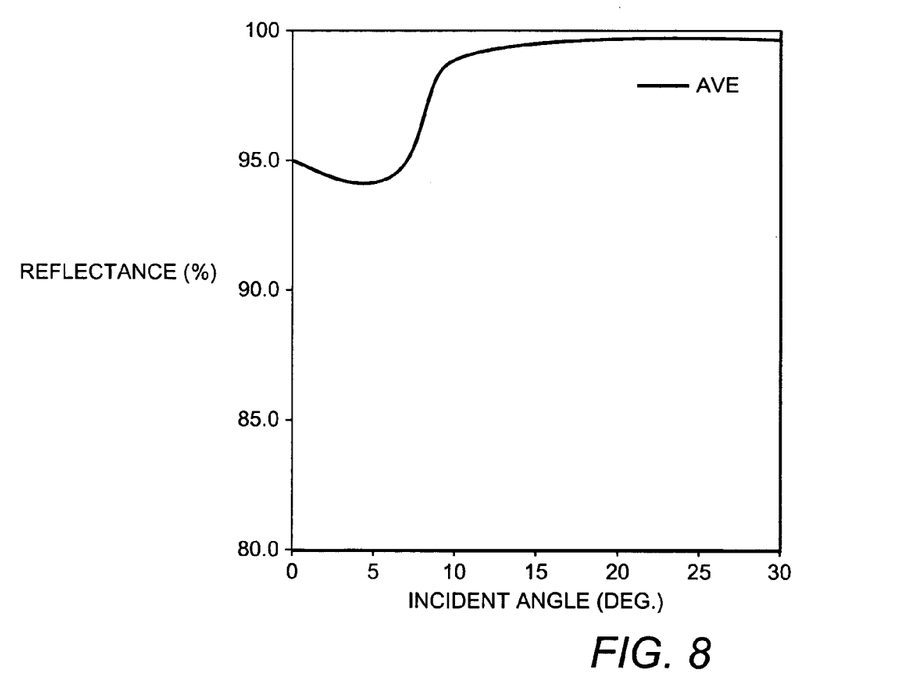
FIG. 8 is a graph illustrating reflectance versus incident angle for an input-beam-facing PBG stack on a face illuminated beam steering apparatus.

FIG. 8 illustrates beam reflectance versus incidence angle for the bottom plate 600 described by Table 4 when illuminated with a beam that has a wavelength of 1550 nm. The AVE, S and P curves indicate high reflectivity over incidence angles between 10-30° with approximately constant reflectance values over the range. Reflectance is reduced between approximately 0-10 degrees incident angle to facilitate introduction of the beam k through the bottom plate and into the space between top and bottom plates 105, 605. Upon initial reflections of the beam k on the top plate 105, the beam k is reflected back to the bottom plate at a larger incidence angle, and experience a higher reflectivity on each bounce until reaching near 100% reflectivity at greater than 10 degrees to trap the beam until its incident angle reaches a predetermined transmission angle through the top plate 105.

Figure 9:
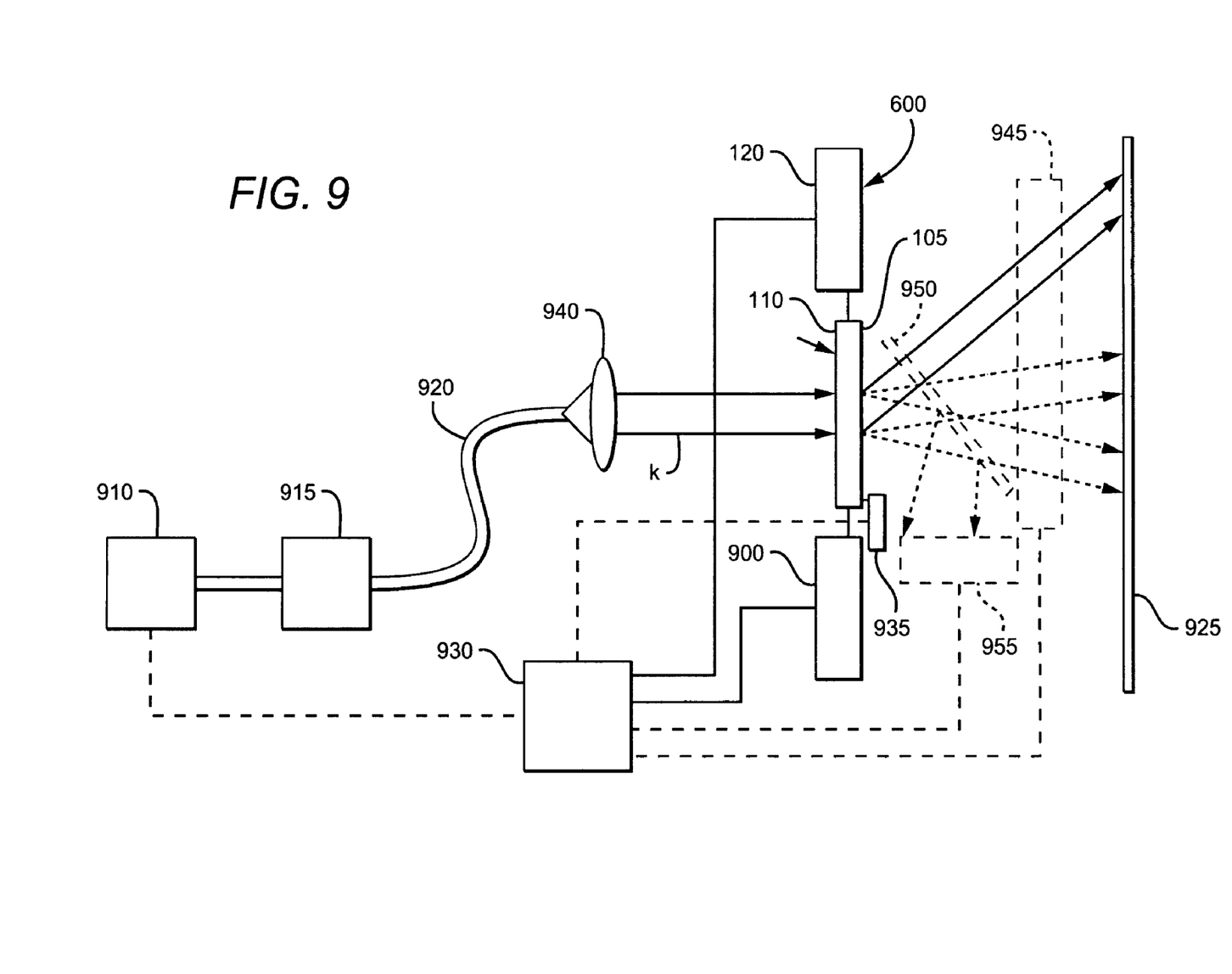
FIG. 9 is a block diagram of a system that has a tunable laser, optical amplifier, lens and dual actuators to steer a beam through a two-plate Fabry-Perot device.

FIG. 9 illustrates a beam steering system that includes the beam steering apparatus 600 with dual actuators 120, 900 to rotate top and bottom plates 105, 110, respectively, to enable steering of beam k in two dimensions. It includes a tunable laser 910 to provide a beam k at various predetermined frequencies to provide fine angular control of the beam k and an optical amplifier 915, such as an Erbium-doped fiber amplifier, to amplify the laser's beam. A fiber optic path 920 is preferably provided to direct the beam k to a beam expander and collimator 940. A target 925 is provided for illustrative purposes. Various potential beam trajectories are illustrated with dashed lines. A microprocessor 930 communicates with the actuators 120, 900 through either a wired or wireless connection path to provide control of the actuators 120, 900.

In one embodiment, fine beam steering control is provided by adjusting the wavelength of the tunable laser 910 with the processor 930. The transmission spectra of the Fabry-Perot filters can also be shifted by either an piezo-electric actuator 935 that is controlled by the microprocessor and placed in the path of beam k, or an electro-optic tuning element placed within either the top or bottom plates 105, 110 or both. Such tuning of the beam wavelength $\lambda_B$ (if an electro-optic tuning element) allows small angular adjustments to each system exit angle, between the discrete coarse-angle spots. If a piezo-electric actuator 935 is used, it would vary the translational distance between the top and bottom faces of the first plate, if the first plate is made as an air spaced Fabry-Perot filter, to provide similar fine-tuning of Fabry-Perot effects for finer angular response of the beam steering system 600. The piezo-electric actuator would be controlled by microprocessor 930 for translational control.

The beam steering device described in this embodiment of the invention can be used as an element in applications where large separation of closely spaced laser lines is required, such as in Raman spectroscopy, or dense wavelength division multiplexing (DWDM) for optical communications. If the input beam to the basic beam steering device (FIG. 9) contains more than one narrow laser line each having different wavelengths, the beam steering device can function as an extremely high resolution spectrometer or wavelength separator (demultiplexor), by sending different, closely spaced wavelength components in significantly different directions at the output of the device. In demultiplexing of discrete DWDM signals, the wedge angle of the device would be held fixed, and the separated exit beams can be sensed by a beam receiver 945 such as a high-speed detector array for data readouts in different channels, or a collection of separate fibers to feed the beams into separated wavelength channels for routing. For the spectroscopic application, the separated beams at the coarse angle settings can be imaged and detected on a camera or detector array 945 in communication with the processor 930 to be calibrated for wavelength versus the exit angle of the beam. If the spectroscopic application involves a continuous spectrum instead of discrete wavelengths, the wedge angle position can be scanned and become another parameter to include in the wavelength calibration of the camera output.

The unique combination of the wedge angle micro-scanning and use of Fabry-Perot plates results in a beam steering device with extraordinary spectral dispersion, measured in degrees/nm. The output angle is very sensitive to the wavelength, a reason behind the ability to fine scan by tuning of the laser wavelength as described above. Conventional diffraction gratings have angular dispersion in the range of 0.05 deg/nm and are polarization sensitive. The coarse-angle dispersion of the beam steering device described here varies with the setting, but is typically >10 deg/nm, and is polarization insensitive. Those skilled in the art can envision using the principles of this device. In such cases, the beam steering device would be designed such that the wavelengths of interest align with the wedge angle settings so that very small wavelength changes occur when switching to new coarse angle(s).

It is also possible to operate the beam steering device in reverse with the input beam entering the beam steering device from the opposite direction, and achieve a new mode or functionality, as beam combiner/multiplexor (i.e. the reversal of the arrows shown in FIG. 9). In one embodiment of such multiplexor, the wedge angle of the device would be held fixed, and multiple light beams of different specific wavelengths would be incident onto the device from the output side of the beam steering device at the correct angles to match the transmission peaks of the Fabry-Perot. Such beams would then be combined into one beam (muliplexed) and can be injected into a fiber, such as fiber optic path 920, as the muliplexor device output, if desired. In such an application, fiber optic path 920 would not be coupled to a laser 915.

Also, although illustrated as an open loop system, both open loop and closed loop control of beam steering are available options. For beam steering systems that are well characterized and stable in terms of applied actuation voltages and angles reached, the system can be used in an open loop configuration. A closed loop configuration would monitor the device output beam by splitting a very small portion of the device's output beam using, for example, a beam splitter 950 and detecting the beam direction on a high-resolution imager 955 that communicates its output to the processor 930 that is then used to adjust and calibrate the input voltages to the angle control system.

While various implementations of the application have been described using a beam frequency of 1550 nm, the system may also use other frequencies, such as those found in the C and L frequency bands. Also, it will be apparent to those of ordinary skill in the art that many more embodiments and implementations are possible that are within the scope of this invention.

What is claimed is:

1. A laser beam steering apparatus, comprising:
    a beam steering cell with an adjustable shape, said beam steering cell having opposing Fabry-Perot filters disposed at an angle to each other, to reflect a beam between said Fabry-Perot filters for emission through at least one of said opposing Fabry-Perot filters at a plurality of predetermined system exit angles;
    a steering mechanism coupled to said beam steering cell to affect a change in said angle so that the direction of a laser beam emitted from said cell is changed in response to a change in the cell shape.

2. The apparatus of claim 1, wherein said opposing Fabry-Perot filters further comprise:
    first and second Fabry-Perot plates.

3. The apparatus of claim 2, wherein said first Fabry-Perot plate further comprises first and second dielectric mirrors.

4. The apparatus of claim 2, wherein said second Fabry-Perot plate further comprises first and second dielectric mirrors.

5. The apparatus of claim 2, wherein said first Fabry-Perot plate comprises:
    a first substrate;
    a plurality of first dielectric layers coupled to said first substrate on a first side; and
    a plurality of second dielectric layers coupled to said first substrate on a second side.

6. The apparatus of claim 5, wherein said plurality of first dielectric layers further comprises a notch filter for beam incident angles less than 10 degrees.

7. The apparatus of claim 2, wherein said second Fabry-Perot plate comprises;
    a second substrate; and
    a plurality of third dielectric layers coupled to a first side of said second substrate.

8. A laser beam steering apparatus, comprising:
    a first Fabry-Perot plate;
    a Fabry-Perot filter, said Fabry-Perot filter spaced adjacent to and at a first angle from said first Fabry-Perot plate to reflect a beam between said first Fabry-Perot plate and said Fabry-Perot filter for transmission of the beam at a first predetermined transmission angle through the beam steering apparatus; and
    an actuator coupled to said Fabry-Perot filter to selectively position said Fabry-Perot filter to a second angle from said first Fabry-Perot plate to block transmission of the beam through the beam steering apparatus and to selectively position said Fabry-Perot filter to a third angle from said first Fabry-Perot plate to transmit the beam through the beam steering apparatus at a second predetermined emission angle;
    wherein said laser steering apparatus is operable to steer said beam for emission at a plurality of predetermined system exit angles.

9. The apparatus of claim 8, further comprising:
    a laser to present a beam to said first Fabry-Perot plate for transmission of a portion of said beam through said first Fabry-Perot plate into said cell.

10. The apparatus of claim 9, further comprising:
    a beam expander to expand said beam; and
    a collimator to collimate said expanded beam.

11. The apparatus of claim 8, wherein said first Fabry-Perot plate comprises:
    first and second dielectric mirrors;
    an electro-optic element sandwiched between said first and second dielectric mirrors to shift transmission peaks of said first Fabry-Perot plate.

12. The apparatus of claim 8, further comprising
    a piezo-electric element coupled to said first Fabry-Perot plate and said Fabry-Perot filter to controllably translate the relative distance between said first Fabry-Perot plate and Fabry-Perot filter.

13. The apparatus of claim 8, further comprising:
    a beam splitter to reflect a portion of said laser beam exiting said cell;
    a camera for receiving said reflected laser beam portion; and
    a processor connected between said camera and said steering mechanism to selectively adjust said steering mechanism;
    wherein said camera, processor and steering mechanism form a feedback system to controllably adjust the direction of said laser beam emitted from said cell.

14. A method of steering a laser beam, comprising:
    reflecting a laser beam between first and second Fabry-Perot plates disposed at an angle to each other in a beam steering cell;
    transmitting said laser beam through said first Fabry-Perot plate in a first direction at a Fabry-Perot transmission peak;
    changing said angle between said first and second Fabry-Perot plates so that said laser beam is transmitted through said first Fabry-Perot plate in a different direction at a different Fabry-Perot transmission peak as a result of changing said angle;

wherein said beam steering cell provides different transmission peaks for said laser beam at different angles to steer said laser beam.

15. The method of claim 14, wherein changing the angle between said plates comprises actuating an actuator coupled to one of said first and second plates.

16. The method of claim 14, further comprising:
varying the frequency of said laser beam to controllably vary the location of said Fabry-Perot transmission peaks.

17. A laser beam steering apparatus, comprising:
a beam steering cell to receive a beam having at least two laser line components each having different wavelengths, said beam steering cell having opposing Fabry-Perot filters disposed at an angle to each other and arranged to
reflect said at least two laser line components between said opposing Fabry-Perot filters for emission through said cell at respective system exit angles which depend on the respective frequencies of said at least two laser line components; and
a laser beam receiver to receive said at least two laser line components, so that the location of each laser line component on said laser beam receiver is indicative of its wavelength;
a steering mechanism coupled to said beam steering cell to affect a change in said angle between said Fabry-Perot filters so that the direction of a laser beam emitted from said cell is changed.

18. The apparatus of claim 17, further comprising a processor connected to said laser beam receiver to match the laser line component location on said laser beam receiver with a wavelength value.

* * * * *